United States Patent Office 3,461,409
Patented Aug. 12, 1969

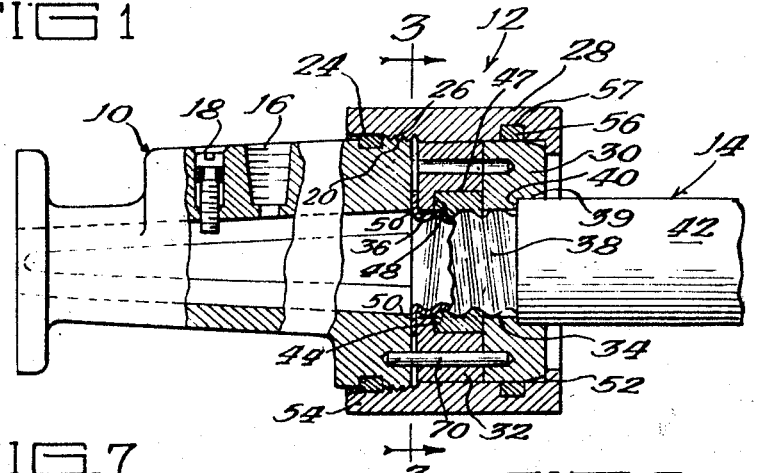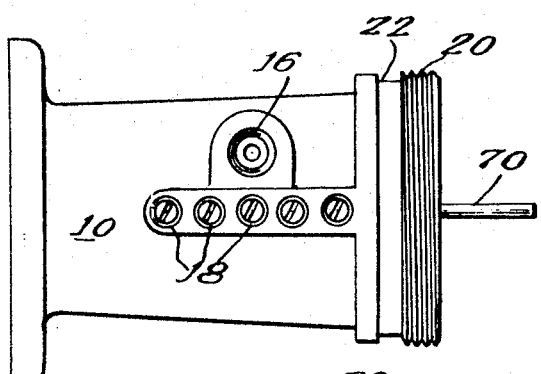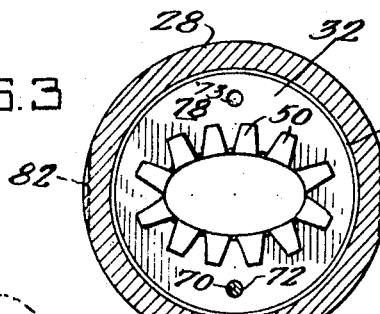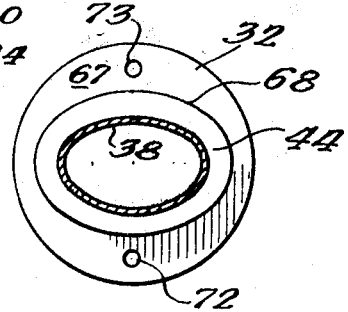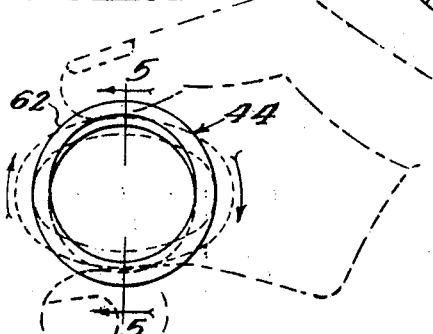

3,461,409
GAS-SEALING ELECTRICAL FITTING FOR NON-CIRCULAR TUBULAR CONDUCTORS
Robert F. Miller, Chicago, Ill., assignor to Andrew Corporation, Orland Park, Ill., a corporation of Illinois
Filed Apr. 20, 1967, Ser. No. 632,265
Int. Cl. H01p 1/00
U.S. Cl. 333—98     9 Claims

ABSTRACT OF THE DISCLOSURE

A coupling or end-fitting for elliptical or generally similar non-circular corrugated waveguide has a gas-sealing ring exerting uniform pressure on the outer surface of the guide and sealing against leakage from the interior. The ring has a uniform cross-section, and an inner threaded surface mating with the helical corrugations of the guide. Pressure is controlled by a limit-stop on compression of the ring, to prevent deformation of the tubular guide.

---

This invention relates to electrical fittings and more particularly to fittings for hollow tubular conductors of non-circular, such as generally elliptical, shape, with provision for sealing against gas leakage.

In the co-pending application of Ernest H. Johnson and Peter F. VanDyke, Ser. No. 461,821, filed June 5, 1965, now U.S. Patent 3,336,543 there is described an electrical connector for elliptical corrugated waveguide with provision for sealing against leakage of gas from the connector interior. The structure there described provides a novel form of seal preventing the escape of gas along certain portions of the connector, but contemplates the employment of a suitable mastic or comparable sealing material for blocking the egress of gas along the outer surface of the guide at its point of entry into the connector. It is a principal object of the present invention to provide a structure avoiding the necessity for employment of such material, while maintaining the simplicity of construction and installation, without introducing any hazard of deforming the elliptical shape and thus producing a cross-section alteration productive of reflections within the guide.

One well known-type substitute for a viscous backing such as a mastic, in making a gas seal around the surface of a tube or similar body, is a resilient ring of rubber or similar material pressed against the surface along which leakage is to be prevented. The efficacy of such a seal varies with the pressure exerted at the interface with the outside surface of the tube or other body, as well as with the length along the tube at which the contact is made. A variety of types of such compression seals are in common use in numerous applications, including electrical connectors. Normally, the seals are made on circular surfaces, and are conventionally formed by compressing a ring about the outside surface, the tightening of a nut commonly being used to exert the required compressive force.

The present invention employs the general type of seal just mentioned, but has a novel construction to achieve the solution of problems found to exist when conventional constructions are employed in making such a seal on an elliptical corrugated tubular electrical conductor, particularly where the connector is of the type shown in the co-pending application mentioned above, wherein a circular nut, similar to those used with circular conductors, is employed in clamping the end of the conductor within the connector.

For such a construction as just mentioned, it is of course possible to merely alter the type of seal used for circular conductors by employing a sealing-ring which has an outer periphery corresponding to that of the circular nut and an aperture conforming to the corrugated elliptical shape of the waveguide. Such a construction is found on experiment to be incapable of achieving, in any reasonable simple manner, the sealing efficiency which is obtained with a circular conductor of the same wall thickness. When compression of such a ring is increased to the point where the seal appears fully satisfactory, it is found that the elliptical tube has become slightly deformed, the minor axis being slightly shortened and the major axis slightly lengthened. Upon analysis, it is found that this phenomenon is due to the combined effects of the pressure differential which this construction produces along the two axes, and the relative weakness of the elliptical shape to compression along the minor axis. Further, such a construction introduces difficulties of installation of the ring, and the ring, when internally formed to conform to the corrugations of the tube, cannot be finally positioned at a continuum of points along the tube.

The present invention provides such a seal which is in all respects, both as regards performance and as regards ease of fabrication and assembly, similar to those heretofore used for circular tubes, and which is free of limitations as regards necessity for great caution in avoiding deformation.

The manner of accomplishment of these objects will best be understood from description of an embodiment of the invention illustrated in the drawing and described below.

In the drawing:

FIGURE 1 is a longitudinal sectional view, partially in elevation, showing the gas-sealing fitting in accordance with the present invention coupling an elliptical waveguide to an elliptical-to-rectangular waveguide transition member;

FIGURE 2 is a sectional view of the fitting and conductor of FIGURE 1 in an intermediate stage of assembly;

FIGURE 3 is a transverse sectional view taken along the line 3—3 in FIGURE 1 in the direction of the arrows;

FIGURE 4 is a view in elevation showing the sealing-ring employed in accordance with the present invention, and a dotted diagrammatic representation of the squeezing of the ring to a generally elliptical shape for threading onto an elliptical conductor;

FIGURE 5 is a sectional view taken along the line 5—5 in FIGURE 4 in the direction of the arrows;

FIGURE 6 is a transverse sectional view taken along the line 6—6 in FIGURE 2 in the direction of the arrows; and FIGURE 7 is a top view in elevation of the transition member of FIGURE 1.

Referring now to FIGURE 1, there is shown an elliptical-to-rectangular waveguide transition having a body 10 of a type similar to that disclosed in the previously mentioned co-pending application and an end-connecting assembly 12 coupling the end of an elliptical waveguide 14 to the transition body 10.

The body 10 has a gas port 16 disposed off-center from a series of tuning slugs 18 on the longitudinal center of the body (as shown in FIGURE 7) for connection of a gas fitting or exhaust line (not shown), and an externally threaded portion 20 on the inner end thereof. A circular recess 22 is located adjacent the threaded portion for receiving a rubber O-ring 24.

The externally threaded portion 20 of the body 10 engages the internally threaded portion 26 of a tubular clamping nut 28 which extends longitudinally over the end of the waveguide 14.

Disposed within the circular interior of the nut 28 are metal clamping-rings 30 and 32, each being externally circular and having an aperture 34 and 36 respectively, of elliptical shape, passing with small clearance over the helically corrugated conductor 38 of the waveguide 14. The clamping-ring 30 has an elliptical shoulder-recess 39 adjacent the aperture 34 which snugly receives the end of the plastic jacket 42 of the waveguide 14 in abutment against the shoulder portion 40. A resilient and flexible sealing-ring 44 (preferably of rubber or rubber-like plastic), having a uniform rectangular cross-section, is threaded on the helically corrugated conductor 38 by means of an internal thread 46, and disposed between clamping rings 30 and 32 within an elliptical shoulder-recess 47 of corresponding cross-section in the latter. Although the ring 44 is shown in its clamped or compressed condition in FIGURE 1, it protrudes slightly from the recess 47 in its unclamped or natural condition, as will be described in detail below. At the exposure end of the guide, a large number of tabs 50 formed by slitting are bent over against the surrounding surface of the clamping-ring 32, as shown in FIGURE 3. An internal circular shoulder 52 on the nut 28 engages the outer end of the clamping-ring 30 and securely clamps the tabs 50 against the facing end of the transition body 10 upon tightening of the nut 28. This action also compresses the sealing-ring 44 against the shoulder 48 within the recess 47 and against the conductor to make a gas-tight seal at the threaded interface. In addition, tightening of the nut 28 compresses the O-ring 24 against the inner surface of the lip 54 of the nut, and also compresses the O-ring 56, which is located in an internal recess 57 on the opposite end of the nut, against the outer circular surface of the clamping-ring 30. Thus the internal environment of the conductor and transition body is sealed at the inner end of the nut by the O-ring 24, at the outer end of the nut by the O-ring 56, and along the surface of the conductor by the sealing-ring 44, the sealing-ring blocking leakage both through the aperture 36 and between the clamping-members 30 and 32.

In the assembly of the transition and connector of FIGURE 1, the nut 28 is positioned over and back from the end of the waveguide 14, and the plastic jacket 42 is stripped back from the end a suitable distance, as shown in FIGURE 2, the flooding material 60 being removed from the corrugations over this exposed portion of the conductor. The clamping-ring 30 is then positioned over the end of the conductor 38 so that the shoulder of the elliptical recess 40 abuts against the end of the jacket 42, which is seated within the recess.

The flexible and resilient rubber ring 44 is threaded onto the conductor 38, and, as shown in FIGURES 4 and 5, has a circular outer surface 62 and a circular concentric threaded aperture 64, providing a generally uniform radial thickness, preferably both circumferentially and longitudinally. The ring 44 is engaged with the end of the conductor by being squeezed or flexed to an elliptical shape corresponding to the cross-section of the conductor, as for example between the thumb and forefinger as illustrated in FIGURE 4 in dotted line, and rotated in the direction of the arrows, which moves the ring longitudinally along the conductor until it is positioned against the end 66 of the clamping-ring 30. The ring 44 is desirably of a resiliency tending to cause retention of its circular geometry, but having a flexibility permitting the generally elliptical shaping as described, this property being termed herein as "finger-flexible." The radial thickness and cross-section of the flexible ring 44 remains continuously uniform at every point along the conductor, or in other words, at every longitudinal position along the conductor regardless of its distance from the end thereof or its orientation with respect to the elliptical shape of the conductor. Thus, the location of the clamping-ring 30 in its final position is not critical, and, as shown in FIGURE 6, the elliptical shoulder-recess 47 within the clamping-ring 32 will always receive the ring 44 with the elliptical confining wall 68 having the same shape and radial thickness as the outer radial surface 62 of the finger-flexible ring when the clamping-rings are properly aligned by means of the alignment-pin 70 on the body 10, which extends through and into the alignment-holes 72 and 74 in the clamping-rings. In addition to providing ease of installation and assembly, these features enable a uniform pressure to be applied by the sealing-ring 44 to the conductor 38 as will be described below. (Additional alignment-holes 73 and 75 are provided in the clamping-rings diametrically opposite 72 and 74, so that the clamping-rings can be installed without regard to the eventual position of the transition body 10, which may have a preferable orientation permitting convenient access to the tuning slugs 18 and the gas-port 16.)

The longitudinal dimension or width of the resilient ring 44 is slightly larger than the inwardly facing elliptical confining-surface 68 of the clamping-ring 32, so that a small gap 76 exists between the two clamping-rings in the unclamped condition. As previously indicated and as shown in FIGURE 3, the end of the conductor 38 is cut into tabs 50 which are bent or flared against the face 78 of the clamping-ring 32. The end of the waveguide is then brought against the inner face of the transition body, with the alignment pin 70 engaging the alignment-holes of the clamping-rings, and the nut 28 is brought toward the body and threaded thereto.

Upon tightening of the nut 28 to the body, the circular tubular inner surface 80 of the nut 28 rotates about the circular outer surfaces of the clamping rings 30 and 32, and the internal circular shoulder 52 drives the clamping rings together, compressing the resilient ring 44 within the shoulder-recess 47, and causing the resilient ring 44 to apply a uniform pressure on the elliptical conductor 38. A maximum pressure may thus be applied along the length of the interface, which at no point exceeds that which causes deformation of the conductor, to effect the best possible seal.

The pressure of the seal against the conductor is controlled and limited by a limit-stop feature which limits the force or compression of the clamping-rings 30 and 32 on the resilient ring 44 to prevent exceeding the pressure which would cause deformation of the conductor. This is provided by the structure of the transverse inner faces 66 and 67 of the clamping-rings which abut each other when the longitudinal dimension or width of the resilient ring is diminished to that of the confining surface 68, and further tightening of the nut 28 to clamp the conductor tabs against the transition, and to form the gas-seals at O-rings 24 and 56, produces no further compression of the ring 44. Flats 82 and 84 are provided so that a wrench may be used to complete the tightening operation after the threaded engagement and initial tightening are made by hand.

The embodiment illustrated in the drawing and described above is a commercial construction which has been found highly satisfactory. However, the teachings of the invention are of course not so limited, and many modifications and adaptations of the overall combination and of the various inventive features thereof for use in constructions substantially different in appearance and detail from that herein illustrated will be readily apparent to persons skilled in the art. Accordingly, the scope of the invention should be limited and defined only by the appended claims, and equivalents thereof.

What is claimed is:

1. In a gas-sealing electrical fitting for a non-circular helically corrugated hollow conductor:
   (a) an apertured flexible ring of generally uniform cross-section having an internal thread engaging the helical corrugations, the ring being adjustable in position by rotation and continuously conforming to the non-circular shape of the conductor upon such rotation,
   (b) confining members having opposed surfaces with matching non-circular apertures therein, and a generally longitudinally extending wall portion spaced radially outward of the apertures between the opposed surfaces and defining, with at least one of the surfaces, a non-circular recess of uniform radial thickness substantially corresponding to that of the ring, (c) the ring being seated in said recess, (d) and means for urging said opposed surface longitudinally toward each other to exert longitudinal deforming pressure on the ring and thus to exert substantially uniform radial pressure of the ring against a conductor in the apertures.

2. The fitting of claim 1 wherein said recess is formed by an internal shoulder on at least one of the confining members and is of uniform cross-section substantially corresponding to that of the ring.

3. The fitting of claim 2 wherein said cross-section of the recess is substantially rectangular.

4. The fitting of claim 1 wherein said means for urging said opposed surfaces comprises a threaded member having a circular apertures therein surrounding the waveguide, said threaded member being threadably engageable with a body having a mating threaded portion, and the threaded member being tightenable to the body upon rotation of the member.

5. The fitting of claim 1 wherein the end of the conductor is flared against an end of one of the confining members, said means for urging said opposed surfaces longitudinally toward each other comprising single tightening means therefor and for clamping the flared end of the conductor against the end of a body adapted to be attached to the fitting.

6. The fitting of claim 5 wherein said single tightening means comprises a threaded member having a circular aperture therein surrounding the waveguide, said threaded member being threadably engageable with a mating threaded portion on the body.

7. A gas-sealing electrical fitting for a helically corrugated non-circular tubular conductor comprising:

(a) a finger-flexible resilient ring of generally uniform cross section having helical internal threads for engaging the corrugations of the conductor, the ring being adjustable in position by rotation and continuously conforming to the non-circular shape of the conductor upon such rotation, (b) means including members forming opposed corresponding non-circularly apertured pressure members acting between opposite ends of the ring for compressing the ring, (c) and a correspondingly non-circular wall confining radially outward deformation of the ring.

8. The gas-sealing fitting of claim 7 further characterized by:

(d) the confining means comprising at least one member forming an inwardly facing elliptical tubular wall portion, (e) the ring being of slightly greater longitudinal dimension than said outer wall portion, and (f) said compressing means including a member having a surface abutting against said one member to limit the longitudinal compression of the ring and thus control the pressure exerted by the ring on the conductor.

9. An assembly comprising a helically corrugated non-circular tubular conductor and a flexible ring of substantially uniform cross-section having an internal thread matching and engaging the helical corrugations, the ring being adjustable in position by rotation and continuously conforming to the non-circular shape of the conductor upon such rotation.

References Cited

UNITED STATES PATENTS

| | | | |
|---|---|---|---|
| 2,556,187 | 6/1951 | Ingalls. | |
| 3,176,064 | 3/1965 | Browne | 174—88.2 |
| 3,336,543 | 8/1967 | Johnson et al. | 333—21 |
| 3,365,681 | 1/1968 | Floyd et al. | 333—98 |

HERMAN KARL SAALBACH, Primary Examiner

LOUIS ALLAHUT, Assistant Examiner